US011663319B1

(12) United States Patent
Giraud (10) Patent No.: US 11,663,319 B1
(45) Date of Patent: May 30, 2023

(54) IDENTITY VERIFICATION SYSTEM AND METHOD FOR GATHERING, IDENTIFYING, AUTHENTICATING, REGISTERING, MONITORING, TRACKING, ANALYZING, STORING, AND COMMERCIALLY DISTRIBUTING DYNAMIC BIOMETRIC MARKERS AND PERSONAL DATA VIA ELECTRONIC MEANS

(71) Applicant: Stephen G. Giraud, Petaluma, CA (US)

(72) Inventor: Stephen G. Giraud, Petaluma, CA (US)

(*) Notice: Subject to any disclaimer, the term of this patent is extended or adjusted under 35 U.S.C. 154(b) by 0 days.

(21) Appl. No.: 17/352,236

(22) Filed: Jun. 18, 2021

Related U.S. Application Data (62) Division of application No. 15/338,380, filed on Oct. 29, 2016, now Pat. No. 11,204,991.

(51) Int. Cl.
*G06Q 30/00* (2023.01)
*G06F 21/45* (2013.01)
(Continued)

(52) U.S. Cl.
CPC .............. *G06F 21/45* (2013.01); *G06F 21/31* (2013.01); *G06Q 30/0226* (2013.01);
(Continued)

(58) Field of Classification Search
CPC .. G06F 21/45; G06F 21/31; G06F 2221/2111; G06F 2221/2133;
(Continued)

(56) References Cited

U.S. PATENT DOCUMENTS 5,960,081 A 9/1999 Vynne et al.
6,633,651 B1 10/2003 Hirzalla et al.
(Continued)

FOREIGN PATENT DOCUMENTS

WO WO-2005084398 A1 9/2005

OTHER PUBLICATIONS

Alexander Weng, "Look Into My Eyes: A Survey of Biometric Sevurity", 2013 10th International Conference on Information Technology: New Generations (pp. 422-427) (Year: 2013).

Primary Examiner — Raquel Alvarez
(74) Attorney, Agent, or Firm — Jimenez Law Firm, Inc; Jose W. Jimenez; Robert Cantrell (57) ABSTRACT

An interactive identity verification system for gathering, identifying, authenticating and registering biometric data of a consumer verified through government agencies while monitoring, tracking, analyzing, storing and distributing dynamic biometric data to ensure access to the secured system remains authorized via monitoring of consumer data and to control authorized access to participating computer systems and programs. Consumer identity is verified with markers gathered from biometric detection and collection devices provided within the system, correlated with unique personal information and geo-location coordinates allowing authorized access to a secure computer system. Dynamic monitoring of consumer biometric data is required to guarantee online identity verification while operating under an alias or avatar to maintain public anonymity, participate in marketing incentive programs and increase security. The system provides for a registered consumer to use multiple registered computer devices while the central repository interfaces dynamically with specific markets to distribute stored data within the system.

13 Claims, 7 Drawing Sheets

(51) Int. Cl.
*G06Q 30/0251* (2023.01)
*G06F 21/31* (2013.01)
*H04L 9/40* (2022.01)
*G06Q 30/0226* (2023.01)
*G06Q 50/26* (2012.01)

(52) U.S. Cl.
CPC ..... *G06Q 30/0257* (2013.01); *H04L 63/0861* (2013.01); *G06F 2221/2111* (2013.01); *G06F 2221/2133* (2013.01); *G06F 2221/2139* (2013.01); *G06Q 50/265* (2013.01)

(58) Field of Classification Search
CPC .......... G06F 221/2139; G06Q 30/0226; G06Q 30/0257; G06Q 50/265
See application file for complete search history.

(56) References Cited

U.S. PATENT DOCUMENTS

| | | |
|---|---|---|
| 7,216,232 B1 | 5/2007 | Cox et al. |
| 7,793,318 B2 | 9/2010 | Deng |
| 10,552,667 B1 | 2/2020 | Bogan, III et al. |
| 10,810,725 B1 | 10/2020 | Dolhansky et al. |
| 2002/0184538 A1 | 12/2002 | Sugimura |
| 2006/0047967 A1 | 3/2006 | Akhan et al. |
| 2007/0083815 A1 | 4/2007 | Delorme et al. |
| 2008/0002894 A1 | 1/2008 | Hayon et al. |
| 2008/0097851 A1 | 4/2008 | Bemmel |
| 2009/0290752 A1 | 11/2009 | Kalva |
| 2010/0177891 A1 | 7/2010 | Keidar et al. |
| 2013/0102283 A1 | 4/2013 | Lau |
| 2014/0325550 A1 | 10/2014 | Winograd et al. |
| 2016/0226883 A1 | 8/2016 | Kusens |
| 2016/0239657 A1 | 8/2016 | Laughlin-Mchugh |
| 2020/0065526 A1 | 2/2020 | Berman |

IDENTITY VERIFICATION SYSTEM AND METHOD FOR GATHERING, IDENTIFYING, AUTHENTICATING, REGISTERING, MONITORING, TRACKING, ANALYZING, STORING, AND COMMERCIALLY DISTRIBUTING DYNAMIC BIOMETRIC MARKERS AND PERSONAL DATA VIA ELECTRONIC MEANS

BACKGROUND OF THE INVENTION

1. Field of the Invention

The present invention relates to government verified authentication systems and impregnable communications networks for individual consumers and, more particularly, to a networked or stand-alone computer implemented identity verification system and method for securely gathering, identifying, authenticating, and registering individual consumer biometric markers correlated with uniquely pertinent personal information and geo-location coordinates and monitoring, tracking, analyzing, storing and distributing dynamic individual consumer data of a registered consumer via electronic means.

2. Background Art

A conventional approach to colossal-scale data systems would be to develop a unique IT-based solution with a central data repository and an extensive amount of remote clients. Such systems, however, are not reliably sustainable or scalable. Bandwidth requisites for recovery and authentic verification operations utilizing tremendous amounts of data from a central data repository would be enormous. Additionally, retrieval reaction times from a central data repository would be excessive. Finally, centralized solutions are susceptible to a number of potential security risks such as fire brigade attacks, spoofing attacks, and social engineering vulnerabilities.

Although systems for biometric data are known, one vulnerability that persists in the industry is the lack of verified and verifiable authentication of the identity of a specific registered consumer while accessing central repository systems. Known infrastructures for biometric data systems and methods do not verify the authentication of an identified consumer via constant dynamic monitoring of positive (live feed) biometric data nor do they verify said identities via appropriate governmental agencies having performed due diligence on proof of life. Also, once an individual consumer has been identified with the aid of biometric verification markers and has been granted access to a secure computer system, dynamic monitoring of biometric data correlated with uniquely pertinent personal information and geo-location coordinates is required to ensure that an authorized user has not exited the system improperly, leaving an opportunity for non-authorized individual consumers to access the secure system.

Although the biometric authentication industry is aware of these problems, current methods for securely gathering, identifying, authenticating and registering individual consumer biometric data are arbitrary at best. There too, is a perception amongst consumers that their privacy is being violated by the collection of biometric data for verification purposes causing justifiable concern about potential vulnerability to identity theft.

There is a need for a system and method for consumers to register their biometric data while concurrently addressing the privacy concerns to maintain public anonymity by allowing registered consumers to operate under a nom de plume, icon, or avatar, in exchange for increased identity security and offers of incentives such as consumer discounts, commercial coupons or frequent user rewards. In addition, there is a lack of ubiquity in providing a registered individual consumer from using multiple registered computer devices as they move throughout the mobile society. Finally, there is a need for systems for biometric data to interface dynamically with specific markets, including but not limited to multiple types of advertising, media (e-billboards, smart eyewear, movie theatres, mobile computing communications devices and POS devices, set top boxes, etc.), healthcare, electoral processes, regulatory/law enforcement, workplace enforcement, control of adult entertainment, credit card use and fraud prevention, intelligence communities, pollster and ratings industries, academic institutions, automobile and building access, air and cruise ship transport to name just a few. Thus, there exists a need for a system and method that securely gathers, identifies, authenticates and registers individual consumer biometric markers correlated with uniquely pertinent personal information and geo-location coordinates that positively monitors, tracks, analyzes, stores and distributes dynamic individual consumer data of a specific registered consumer.

SUMMARY OF THE INVENTION

The present invention overcomes the aforementioned problems, and is distinguished over the prior art in general, by a computer implemented interactive identity verification system and method that securely gathers, identifies, authenticates and registers individual consumer biometric markers correlated with uniquely pertinent personal information and geo-location coordinates that monitors, tracks, analyzes, stores and distributes, dynamic consumer data of a verified registered consumer. The system then utilizes the data to (a) control authorized access to computer systems and/or programs and (b) ensure continued access to the secured system remains authorized via positive (live feed) monitoring of users' biometric markers correlated with uniquely pertinent personal information and geo-location coordinates. The system first provides a mechanism for consumers to apply for participation in the present identity verification system. The system then provides an application for individual consumers to participate in the system. Once the application is approved, the system provides a method of fulfilling an order to deliver a commercially available biometric detection and collection device suitable for use on the system. Types of biometric detection and collection devices include but are not limited to: an existing computer ready camera, (e.g. including those used in Kirlian photography—also known as corona discharge photography or spark electrography, which has been shown to demonstrate an electro-chemical image to measure or assess the vital force in living systems, and to evaluate the electrical discharge from a living object when impressed with a high voltage field), and one or more of: an existing computer ready microphone and/or bio-metric mouse, sphygmomanometer (BP) cuff, thermometer, pulse and respiration detector, microwave plethysmograph, skin conductance biosensor, urine, fecal, blood and blood sugar analyzer, scent receiver, scent generator, electrocardiogram electrodes, a electroencephalography cap, smart contact lens, embed sensors, a sub-dermal implant, a pulse oximetry, a magnetic stripe reader, a 3-D dental scanning device, Universal Product Code (UPC), Infrared or Radio Frequency Identification (RFID) scanner, and an electronic signature pad, if such a biometric detection and collection device is not already in the possession of the consumer.

Once the biometric detection and collection device(s) is/are received by the applying individual consumer, the system provides a method to install the biometric detection and collection device(s) along with corresponding software to an appropriate computer device/system to provide a dynamic communication link to identify a specific consumer within the system. Once the applying consumer installs the one or more of an already existing biometric detection and collection device(s) with corresponding software within the dynamic communication link, the system provides a method for an applying individual consumer to register by providing any current government issued driver's license, state or national ID, military identification or passport within their possession when prompted to display the government issued form of identification on the cameras field of vision to capture the possessors image for comparison with the applying individual consumer facial image when prompted to display on the cameras field of vision along with the possessors registered address for positive identification. The system may also provide a method to collect a fingerprint from a biometric computer mouse to be compared along with the possessors' facial image. Once the individual consumer completes this step in the process, the system provides a method to analyze and compare the collected biometric markers and image of a current government issued driver's license, state or national ID, military identification or passport to ensure that they are identical then submit the collected biometric markers and image of a current government issued driver's license, state or national ID, military identification or passport to the system's server in order to forward the collected biometric data and image of a current government issued driver's license, state or national ID, military identification or passport and directly communicate electronically with the corresponding state or federal government agency that is responsible for authentication of government issued forms of identification.

The system then communicates via computer interface with the corresponding state or federal government agency to authenticate the consumer's identity by responding in the affirmative. In the event that the corresponding state or federal government agency is unable to authenticate the applying individual consumer's identity, the system communicates via computer interface, denying authentication. Once this process is completed, the system's server will notify the applying individual consumer of the corresponding state or federal government agencies response, allowing the applying consumer to correct the issue causing the authentication denial and to re-apply through the information website of the system. If the corresponding state or federal government agency authenticates the applying individual consumer's identity, the system provides a method for the consumer to register within the system for public viewing as themselves or with the use of a nom de plume and/or avatar to dispel privacy concerns and maintain public anonymity. The system then conducts a quality control authentication process within the system to verify that the registering individual consumer is identical to the applying individual consumer. In the event that the registering individual consumer is denied a quality control authentication within the system, the individual consumer may re-register. If the quality control authentication verifies the registering individual consumer's identity, the system provides for the verified registered individual consumer to register for a consumer discount, commercial coupon or a frequent user reward program with the various markets. Once this process is complete, the system provides a method for the individual consumer's identity to be publically reflected in the manner selected by the individual consumer on commercial/government websites, social networks, etc., with the present system monitoring, analyzing and storing the individual consumers' government authenticated identity.

The system may also provide a method in which the website receiving the registered individual consumer's chosen identity will reflect a standardized animated icon that constantly monitors the session to be displayed on computer networks indicating the government certified identity of the registered individual consumer has been verified. The system constantly monitors dynamic human interaction while logged on to the system which may include one or a plurality of methods indicating proof of life such as facial or eyelid movement, pupillary dilation, breathing, heartbeat, temperature, scent, emotional, cognitive, and physical arousal, or constant finger print placement collected by the corresponding biometric detection and collection device. The system provides for a time-out of a predetermined amount of time if any of the registered biometric markers of the individual consumer are absent, that then blocks the individual consumer from continuous use of the system.

The system includes a method to attract individual consumers to apply for registration in the identity verification system. Preferably the method to attract individual consumers to apply for registration of the system consist of, but is not limited to, a promotional advertisement that directs the consumer to the system's website which instructs the individual consumer on the necessary process to take in order to apply and register for access to the system. Additionally, the system includes, but is not limited to, a method to induce individual consumers to apply for registration with enhanced security, a form of a monetary credit or incentive to an online banking repository or commercial institution, a donation credit or incentive to a non-profit organization, or a predetermined amount or value incentive of a frequent user award program for the individual consumer to redeem within the system. The proposed frequent user award program may be redeemed once the individual consumer has successfully applied for, been identified and authenticated by a government agency, then registered their dynamic biometric markers correlated with unique pertinent personal information and geo-location coordinates for a specific consumer and frequented the system with a predetermined amount of time within the system.

The system provides a method for individual consumers to apply for registration to access the system wherein the individual consumer will submit unique and pertinent personal information to assist in the identification and authentication process. This may include but not be limited to the individual consumers' name, alias, birth date, city/state and/or country of birth, physical description, parents married and maiden name(s), current address(es), current and past employer(s), preferred password, social security number and other similar information.

Additionally, the system includes a method for individual consumers to apply for registration to access the system of invention wherein the consumer will submit their geo-location coordinates to specifically determine the individual consumer's latitude and longitude.

Additionally, the system provides a method to fulfill an order to deliver one or a plurality of computer ready biometric detection and collection device(s) to gather unique biometric markers specific to the individual consumer applying to aid in the registration process to access the system of invention. One or a plurality of computer ready biometric detection and collection device(s), once received by the applying individual consumer, will need to be installed with corresponding software to further the application process. The system then provides a method in which to gather the biometric markers that instruct the applying individual consumer to utilize the biometric detection and collection device(s) to insure gathering the most accurate specimens to be compared to authentic government forms of identification.

The method for the individual consumers to apply requires the analysis and comparison of the collected biometric markers and image of a current government issued driver's license, state or national ID, military identification or passport to ensure that they are identical then be submitted through the systems computer servers and routed to but not limited to the corresponding government agency in the state or country that issued the authentic form of identification which may include one or more of the state(s) Department of Motor Vehicles (DMV) Department of Defense (DOD) or Department of State computer servers for identifying and authenticating the specific consumer applying for access to the present system.

Once the corresponding government agency that issued the authentic identification to the applying individual consumer responds to the systems query for authentication via the automated system severs, the system provides a means to inform the applying individual consumer whether or not their identification has been authenticated by the corresponding government agency. If the individual consumers' application for identification authentication has been denied by the corresponding government agency, then the system provides a method for the individual consumer to correct the issue causing the denial and to re-apply through the information website of the system. If the individual consumers' application for identification authentication has been approved by the corresponding government agency, then the system provides a means for notifying the individual consumer of the affirmative response and to begin the registration process for gaining access to the system.

The present system provides a method for registering the individual consumer whose identification has been authenticated by a corresponding government agency. The method for the individual consumer that has received an affirmative response from the corresponding government agency authenticating the individual consumers' identification selects but is not limited to one or a plurality of identification options for public disclosure which may include the individual consumers authenticated identification, a nom de plume and/or an avatar to dispel any privacy concerns and maintain public anonymity. The system provides a method in which to select an avatar that may be available on the systems website or from a third party commercial website. The avatar may include a means to incorporate physical characteristic cues from the registered individual consumers biometric markers collected from one or a plurality of the computer ready biometric detection and collection device(s) issued to the registering individual consumer in order to display a dynamic animated video feed of what appears to be a living avatar.

The method for registering allows a registered consumer to select personal preferences for receiving individually targeted promotional advertisements. The method to select personal preferences includes but is not limited to the unique and pertinent personal information already submitted by the applying individual consumer, combined with geo-location coordinates to specifically locate the individual consumer and a categorical selection of interests to develop a unique profile for the registered individual consumer. In addition, the system provides for a means to constantly monitor dynamic (live feed) human interaction while logged on to the system which may include one or a plurality of means indicating proof of life such as facial or eyelid movement, pupillary or retinal dilation, breathing, heartbeat, temperature, scent, emotional, cognitive, and physical arousal, or constant finger print placement collected by the corresponding biometric detection and collection device(s). The collected biometric markers may indicate the preparation or an acceptable response of the promotional advertisement and be used to adjust the message of the promotional advertisement as well as prevent automated computerized advertising fraud.

Additionally, the system may provide a method intended to mentally prepare, condition or stimulate human senses such as the use of an Extremely Low Frequencies (ELF) pulsing field used for mood alterations.

The system may include a commercially available scent-generating device. The scent-generating device generates a scent, projected by the system, associated with the promotional advertisements as they are being displayed. The scent generating means is to enhance greater memory recall of a given promotional advertisement by projecting an odor, fragrance or aroma associated with the promotional advertisement. Further, the system may comprise a biometric scent-receiving device. The scent-receiving device gathers scents generated by the individual viewing consumer, identifies the scent as socially acceptable or unacceptable by predetermined parameters that are measured to indicate whether a promotional advertisement is warranted to persuade the individual viewing consumer to alter the scent that is being projected by the individual consumer. The scent-receiving device may also gather scents generated by the individual viewing consumer to identify the scent as medically acceptable or unacceptable by predetermined parameters that are measured to indicate whether medical treatment is warranted. The scent-generating and receiving devices may be fulfilled from within the system of invention to the individual consumer.

Additionally, the system includes a means to monitor the registered individual consumers collected biometric markers correlated with uniquely pertinent personal information, geo-location coordinates and system usage in order to award the registered individual consumer a form of a monetary credit or incentive to an online banking repository or commercial institution, a donation credit or incentive to a non-profit organization, or a predetermined amount or value incentive of a frequent user award program for the individual consumer to redeem within the present system.

Additionally, the system includes a means to track the registered individual consumers collected biometric markers correlated with uniquely pertinent personal information, geo-location coordinates and system usage in order to develop a unique and comprehensive profile of the registered individual consumer with complex algorithms. The means includes but is not limited to the unique and pertinent personal information already submitted by the applying individual consumer and geo-location coordinates combined with a categorical selection of interests to develop a unique profile for the registered individual consumer. The tracking means may include the registered individual consumers collected biometric markers correlated with uniquely pertinent personal information, geo-location coordinates and system usage as they travel throughout the mobile society, using multiple registered computer systems with corresponding biometric data detection and collection devices within the present system.

The system provides a means to analyze the monitored and tracked unique and comprehensive profile of the registered individual consumer to catalog, collate and project with complex algorithms a potential sequential course for the individual consumer to take in all physical, mental, emotional and commercial matters within the system. The system also provides a means to store the analyzed, monitored and tracked unique and comprehensive profile of the registered individual consumer to warehouse in a central repository to be made commercially available for distribution.

Finally, the system provides a means to commercially distribute the stored unique and comprehensive profile of the registered individual consumer warehoused in a central repository. The system's method of commercial distribution requires the registration and verification of the commercial or government entity within the system of invention through the systems automated servers. In order to maintain proprietary ownership of the unique and comprehensive profile of the registered individual consumer to the system of the invention, once verified and registered, the commercial or government entity may have access to the raw dynamically collected real-time data of the registered individual consumer. The unique and comprehensive profile of the registered individual consumer may be made commercially available as one or a plurality of transactions but not limited to unique individual biometric markers or a comprehensive profile complete with cataloged, collated and an analytical projection formulated with complex algorithms of a potential sequential course for the individual consumer to take in all physical, mental, emotional and commercial matters within the system.

BRIEF DESCRIPTION OF THE DRAWINGS

The following section describes the present invention with reference to exemplary embodiments illustrated in the figures, in which.

DETAILED DESCRIPTION OF THE INVENTION

The following description provides an in depth description of the present invention. However, for those skilled in the art, it will be understood that the present invention may be developed with some, or all of these specific details. In the case of other descriptions, such details of methods and procedures have not been detailed so as not to cause ambiguity of the present invention.

As used in conjunction with the present invention the terms "consumer", "individual consumer", and "registered consumer" are used. It should be understood that the difference between an applying consumer and a registering consumer is that the applying consumer has their face and thumbprint compared to a physical ID; whereas the registering consumer has their ID authenticated by a Government Agency once their face and thumbprint are determined to be identical to the photos on the ID during the application phase of the verification process. It should also be understood that purpose of the biometric verification process is to insure that the consumer applying and registering to use the system is indeed alive and breathing and that the applying consumer is not using a photograph or thumbprint from another consumer.

The present invention is a computer implemented identification verification system for harvesting dynamic biometric information of an individual consumer for commercial distribution, the system includes a server coupled with a computer processor having memory storage and computer executable software programs stored therein, one or more registered biometric detection and collection devices connected in communication with the processor and operative upon instructions from program instructions to gather biometric information from an individual consumer. The biometric detection and collection device is interfaced in communication with a registered personal computer or mobile computing communication device and interfaced in communication with a government agency. Upon execution of software program instructions by the computer processor, the biometric detection and collection device(s) and registered personal computer or mobile computing communication device are caused to gather biometric markers and uniquely personal information directly from an individual consumer to authenticate the identity and proof of life of the individual consumer, and the consumer's geo-location.

The present biometric verification and data management system supports nine functions: gathering, identifying, authenticating, registering, monitoring, tracking, analyzing, storing, and distributing individual consumer biometric markers correlated with uniquely pertinent personal information and geo-location coordinates of individual consumers. Each function engenders an estimated 1 Mb of data per individual consumer, which will in turn be transmitted to a multitude of personal computers, mobile computing communications devices, websites, remote media outlets, and stored at a central repository. In regions of the globe with the densest populations, the entire process must be robust enough to manage hundreds of millions of hits per day to the database, requiring the average turnaround time of biometric verification to be measured in seconds. Some regions of the globe may present unique demographic challenges; for instance, when numerous municipalities are scattered in areas where the capabilities and functionality of communication and technology are limited.

The present invention manages these challenges via several specific system characteristics. First, uniqueness of the online biometric verification process is authenticated by collecting a sufficient amount of biometric markers, pertinent personal information and geo-location coordinates from each applying individual consumer and routed to a state or federal government agency that issued the individual consumers identification to compare with the applying individual consumers data on file to authenticate the collected biometric markers, pertinent personal information and geo-location coordinates of the applying individual consumer. Second, the biometric markers are gathered directly dynamically from the applying individual consumer at the applying individual consumer's personal computer and or mobile computing communications device to prevent spoofing and identity theft. Third, distributed Data Banks (DB's) are diffused with the gathered information for various registered individual consumers distributed to the furthest reaches of the database based on the registered individual consumer's biometric markers, pertinent personal information and geo-location coordinates. Retaining the registered individual consumer's data in distributed Data Banks (DB's), lowers bandwidth demands, provides near instantaneous retrieval response times, and reinforces the ubiquity of the system for registered individual consumers when they travel to different areas of the globe. Fourth, an identification verification process utilizing biometric markers as a retrieval key when it is essential to verify a registered individual consumer's identity has been authenticated. Fifth, each biometric detection and collection device integrated with the registered individual consumers personal computer and or mobile computing communications device is provided within the system and designed to recognize when the systems connection is off-net, and to mirror system connectivity when the system is disconnected from the Internet so that the Communication Manager (CM) within the Central Operations Center (COC) of the system can implement identical actions within the system regardless of whether the system is connected to the Internet or not. When the system is disconnected, the system retains the gathered biometric markers correlated with pertinent personal information and geo-location coordinates in a secured database until the connection is restored. The biometric markers correlated with pertinent personal information and geo-location coordinates can be stored in the Data Banks (DB's) until the site is connected and the biometric markers correlated with pertinent personal information and geo-location coordinates can be uploaded, or until the system's Data Banks (DB's) are directed to a mirror site for a Verification Request (VR) or dynamic monitoring (live feed) of the registered individual consumers session. Sixth, the secured Data Banks (DB's) can also be used for local identity verification using stored individual consumer information that has been authenticated by the Central Operations Center (COC) communicating directly with a state or federal agency that has demonstrated proof of life/identity for the applying individual consumer.

There are challenges specific to each region of the globe for implementing such a gargantuan biometric verification and personal data management system, especially in locations that lack dependable communication capabilities. In order to design and execute such a system of biometric identification and personal data management in regions with large populations, the region must have the technological means to support and store tremendous amounts of biometric and demographic information. It is preferred that biometric markers be used to identify individual consumers, even though 1 Mb of data per individual consumer is estimated to be used, because the use of biometric markers ensures that each individual consumer will receive a unique identification number or identifier that can be matched only to that unique living individual human being which may be encrypted and embedded within the nom de plume, icon, or avatar. This estimated amount of data use will result in the necessity for the storage and access capability of hundreds of terabytes of information. Because of the deficiencies of aforementioned traditional IT based centralized solutions, the present invention preferably employs a system of distributed data banks.

The present biometric identification and personal data management system comprises a Central Operations Center (COC), which is responsible for two keystone functions: the Communication Manager (CM) and the Archive Manager (AM). The Communications Manager (CM) is responsible for receiving all Verification Requests (VR) from individual consumers and directing them to a Data Group (DG) where the consumer's biometric markers and personal data are stored. Once the Verification Request (VR) has been processed and verified or rejected by the Data Group Manager (DGM), the Communications Manager (CM) will automatically return the response to the individual consumer awaiting verification. Upon rejection, the individual consumer is notified that they may return to the information website 10 of the system to log in to correct the issue causing the rejection. Once corrected and upon verification, the individual consumer is notified that they have full system access. The Data Group Manager (DGM) is the database controller and processing center. The Archive Manager (AM) is responsible for monitoring all Data Groups (DG's) (and mirrors) for damage, data integrity, system usage, scheduling regular backups and initiate emergency backups as needed. The Archive Manager (AM) is also responsible for data backups to hard, secure off-site locations, as well as any needed restorations. Data Groups (DG's) are databases where individual consumer biometric markers and personal data are stored, grouped by criteria such as geographical region or operational and administrative criteria such as user density (i.e. 1,000,000 users per Data Group (DG) or numerically by unique individual consumer identification numbers. Data Groups (DG's) (and mirror sites) are location independent as long as all system components are networked using an ultra-high-speed network. When a Verification Request (VR) is received from the Communications Manager (CM), the Data Group Manager (DGM) will access the Data Banks (DB) where the individual consumer's biometric markers and personal data are stored and evaluate the Verification Request (VR) to determine if the individual consumer submitting the (VR) matches the individual consumer "human being" the biometric markers and personal data belongs to. Once the VR has been verified or rejected the response is routed back to the Communications Manager (CM) for responding to the individual consumer. Upon rejection, the individual consumer is notified that they may return to the information website 10 of the system to log in to correct the issue causing the rejection. Once corrected and upon verification, the individual consumer is notified that they have full system access.

Figure 1A:
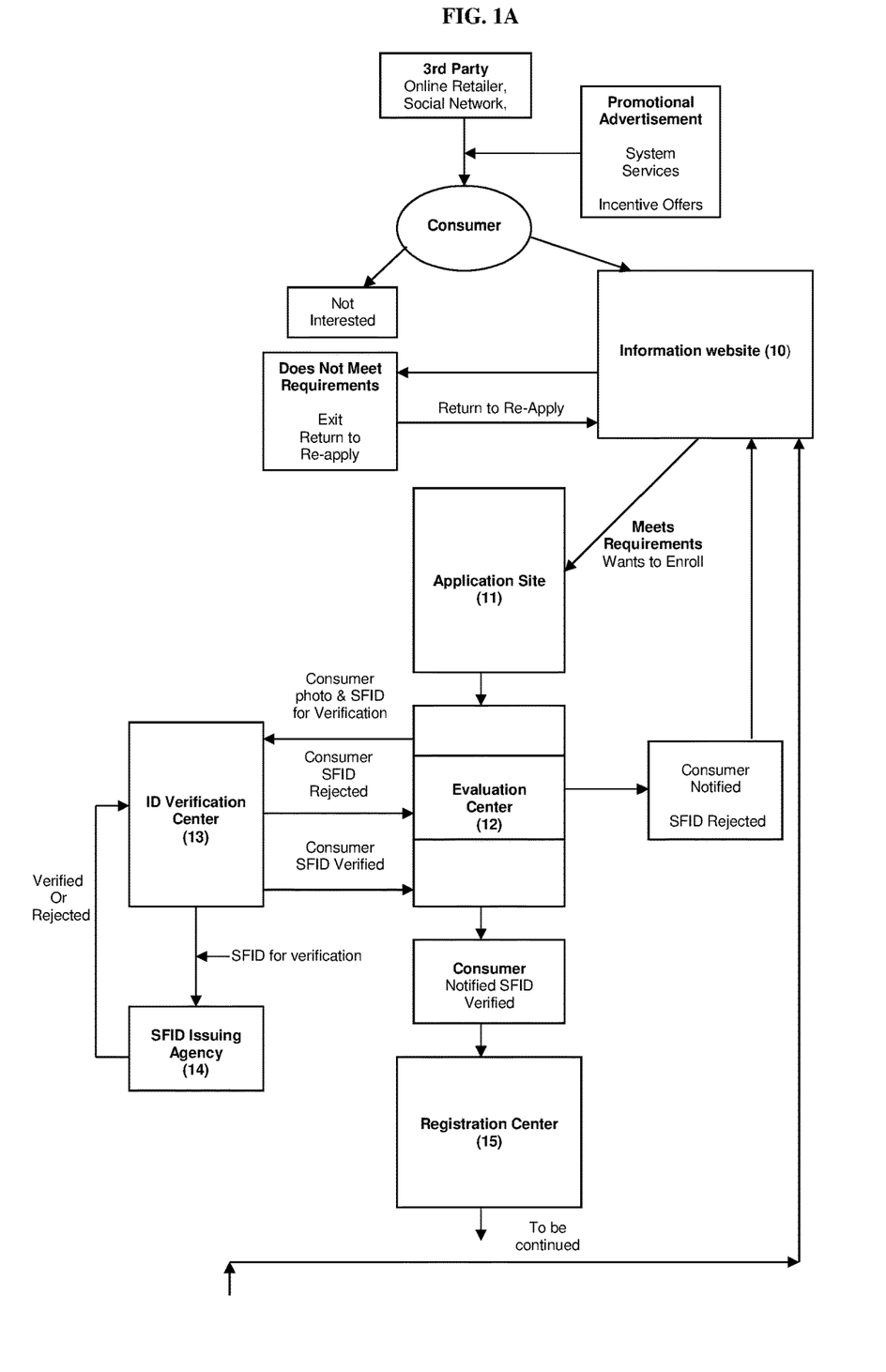
FIGS. 1A and 1B, taken together is a flow chart illustrating the steps of an exemplary embodiment of a method of the present invention when utilized for applying and registering for access to the identity verification system for authenticating biometric markers of a specific consumer being correlated with pertinent personal information and geo-location coordinates.
Figure 1B:
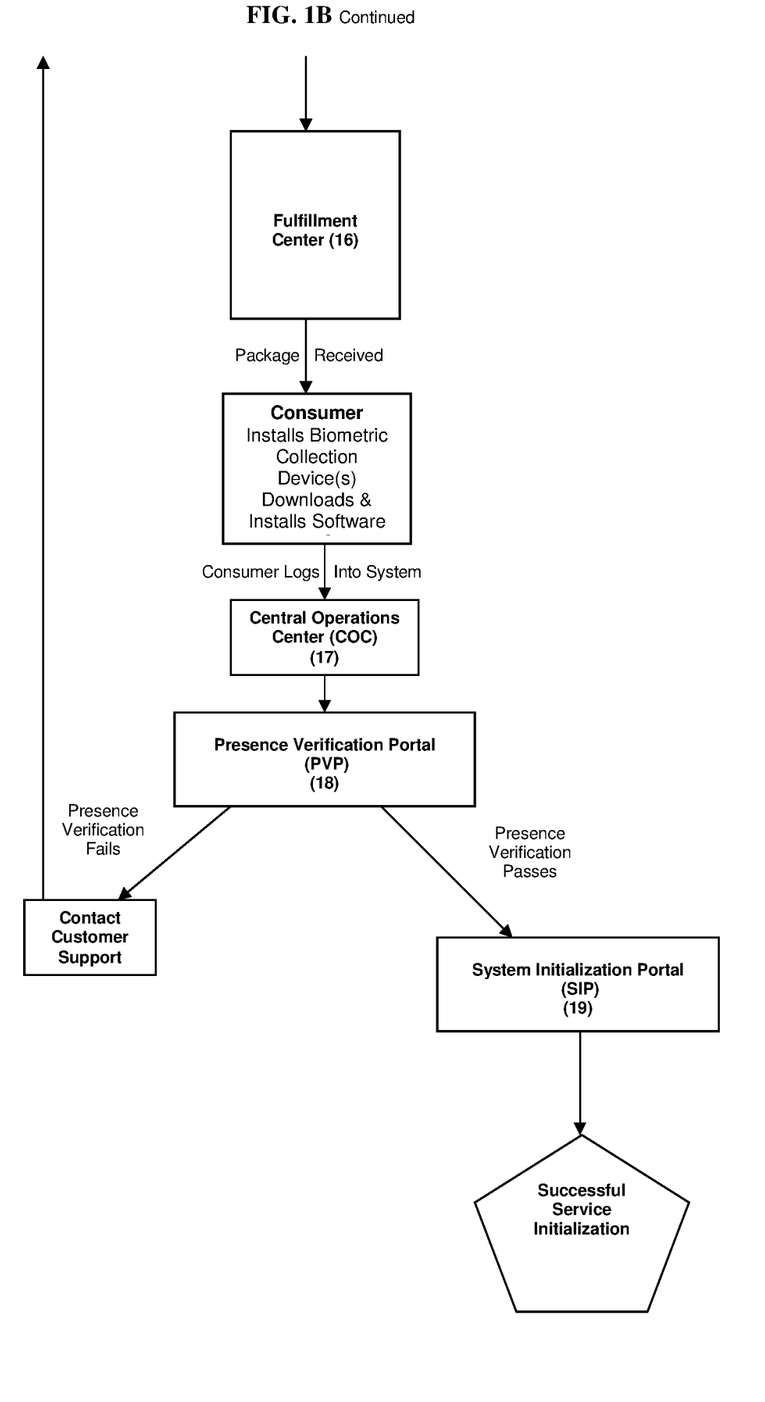

Referring now to the drawings by numerals of reference, FIGS. 1A and 1B taken together, is a flow chart illustrating the steps of an exemplary method of the present invention when utilized for applying and registering for access to an online identity verification system for authenticating biometric markers of a specific consumer being correlated with pertinent personal information and geo-location coordinates. An individual consumer is guided from a third party such as an online business, a social network, a search engine or a financial institution to the system of invention through incentive programs. The individual consumer enters the information website of the system 10, which is a mechanism to educate the applying individual consumer as to the services and benefits of the system's use and on the registration requirements which requires a current state or federally issued form of Identification (SFID) such as a driver's license, state identification, military identification or passport. In the event that the applying individual consumer does not meet the requirements for registration, the individual consumer exits the system of invention and will have the opportunity to re-apply through the information website of the system 10 when all requirements are met. In the event that the applying individual consumer does meet the requirements for registration, the individual consumer is guided into the application site of the system's website whereby the individual consumer is instructed to complete an online application and an associated questionnaire. The applying individual consumer is instructed to take a digital photograph of the applying individual consumer's current state or federally issued identification. The applying individual consumer displays his or her identification within the visual field as displayed on the individual consumer's computer or mobile computing communications device screen or by uploading the photograph from a separate camera device within the visual field as displayed on the individual consumer's computer or mobile computing communications device screen. The next step in the application process is for the individual consumer to take a digital photograph or "selfie" of his or her own face. The term "selfie", by definition, is a self-portrait photograph, typically taken with a digital camera such as a smartphone, tablet, or webcam. The individual consumer is instructed to format his or her face within the provided displayed visual field of the camera as produced on the individual consumers computer or mobile computing communications device screen and once the camera is in focus, save, then upload the digital photograph or "selfie" of their face and of the SFID along with the application to the application center within the system.

Once the application and the photographs of the individual consumer and of the state or federally issued identification are received within the evaluation center 12, the photographs are compared to one another in order to verify that the applying individual consumer matches the individual consumer displayed in the SFID through the analysis of biometric markers and complex biometric algorithms within the identification verification center 13. In the event that the authenticity of the individual consumer's SFID is rejected, then the individual consumer does not meet the requirements for registration within the evaluation center 12, the individual consumer will then exit the system of invention and will have the opportunity to re-apply through the information website of the system 10 when all requirements are met. In the event that the individual consumer's digital photograph or "selfie" and of the SFID has been positively verified as identical by the identification verification center 13, the individual consumer's state or federally issued identification will be forwarded to the corresponding state or federal identification (SFID) issuing agency 14 for electronic authentication. In the event that the individual consumer's state or federally issued identification is rejected by the SFID issuing agency 14 as being invalid, then the individual consumer does not meet the requirements for the evaluation center 12, the individual consumer is notified of the rejection and is instructed to correct the invalid identification before re-applying through the information website of the system 10. In the event that the individual consumer's identification is authenticated through the SFID issuing agency 14, the individual consumer is notified of the SFID authentication then proceeds to the registration center 15.

Figure 2:
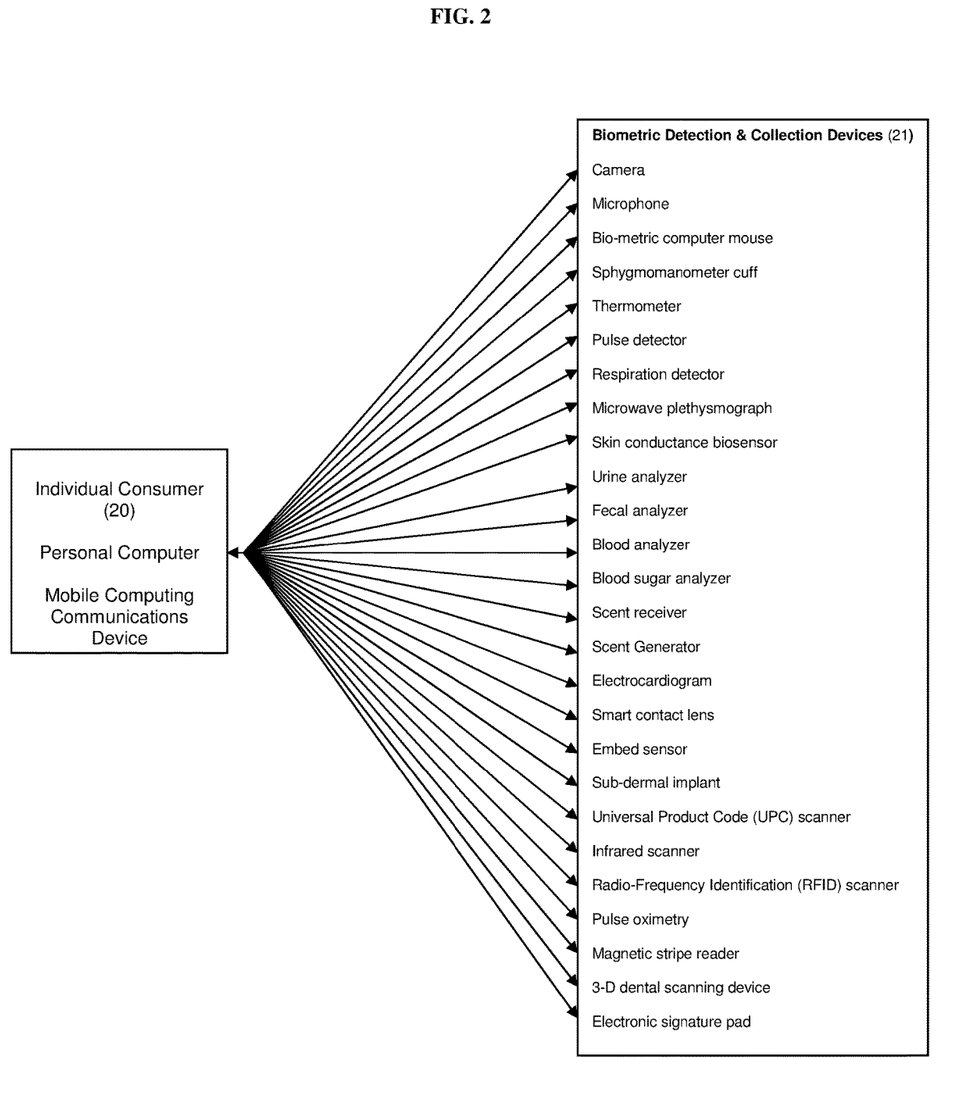
FIG. 2 is a simplified block diagram of an exemplary embodiment of a OEM biometric detection and collection device interfacing with an individual consumers personal computer or mobile computing communication device.

At this step in the process, the individual consumer is instructed to fill out and to submit pertinent personal information, a marketing questionnaire for interest and preferences, select a nom de plume and an avatar for public identification display. In addition, the individual consumer is instructed to select any additional biometric detection and collection device(s) 21 as needed for future use within the system. As seen in FIG. 2, types of biometric detection and collection devices include but are not limited to: an existing computer ready camera, (e.g. including those used in Kirlian photography—also known as corona discharge photography or spark electrography, which has been shown to demonstrate an electrochemical image to measure or assess the vital force in living systems, and to evaluate the electrical discharge from a living object when impressed with a high voltage field), and one or more of an existing computer ready microphone and/or bio-metric mouse, sphygmomanometer (BP) cuff, thermometer, pulse and respiration detector, microwave plethysmograph, skin conductance biosensor, urine, fecal, blood and blood sugar analyzer, scent receiver, scent generator, electrocardiogram electrodes, a electroencephalography cap, smart contact lens, embed sensors, a sub-dermal implant, a pulse oximetry, a magnetic stripe reader, a 3-D dental scanning device, Universal Product Code (UPC), Infrared or Radio Frequency Identification (RFID) scanner, and an electronic signature pad The fulfillment of the selected biometric detection and collection device(s) 21 is made by the fulfillment center 16. Within the fulfillment center 16, biometric detection and collection devices 21 are packed and shipped with key codes for downloading the biometric telemetry software, instructions for installing the biometric detection and collection device(s) 21 and software along with customer support and contact information if needed. The instructions direct individual consumer's to log into the Central Operations Center (COC) 17 to complete the final verification and initialization of service upon successful installation of all biometric detection and collection device(s) 21 with corresponding software. Once the package is fulfilled and received by the individual consumer, the individual consumer installs the biometric detection and collection device(s) 21 along with corresponding software. The individual consumer is then instructed to log into the system's Central Operations Center (COC) 17 to complete the registration process in order to initiate service.

The next step in the registration process is for the individual consumer to enter the presence verification portal (PVP) 18 where the system performs a presence verification based on facial recognition and/or thumb print analysis or any other biometric marker in order to verify that the registering individual consumer is identical to the applying individual consumer. In the event that the presence verification fails, the individual consumer does not meet the requirements for the presence verification portal registration, the individual consumer contacts customer support and has the opportunity to re-register. In the event that the individual consumer passes the presence verification portal (PVP) 18, the individual consumer is guided into the system initialization portal (SIP) 19 where additional biometric markers correlated with pertinent personal data and geo-location coordinates via biometric detection and collection device(s) may be gathered and processed. The initialization portal (SIP) 19 then issues a unique identification number (UIN) to the registering individual consumer to be used within the system of invention. Upon issuance of the UIN, the individual consumer has achieved a successful service initialization and is now authorized for full system access.

Referring additionally to FIG. 2, upon receipt of the package from the fulfillment center 16 (FIG. 1B), the consumer installs the biometric detection and collection device 21, along with corresponding biometric telemetry software for installation on the individual consumers computer or on a mobile computing communicating device 20. Upon successful installation of the biometric detection and collection device(s) and corresponding software, the consumer initializes the interface to test for connectivity and for successful communication. Upon verified communication between the consumer and the system, the consumer can log into the system.

The individual consumer initiates a session log in on a computer or a mobile computing communicating device 20 whereby their biometric markers correlated with pertinent personal information and geo-location coordinates are directed toward to the Central Operations Center (COC) 17 (FIG. 1B). Once received by either the Communication Manager (CM) 22 or the Archive Manager (AM), the information is either directed toward the Data Group (DG) whereby the Data Group Manager (DGM) directs the individual consumer's data to a Data Bank (DB) or the Archive Manager (AM) directs it to the central repository.

Upon successful application and registration, the subscriber client logs into the system and upon successful log in has full access and use of the system. Commercial distribution is achieved by subscriber clients accessing the Central Operations Center (COC) 17 (FIG. 1B) and requesting any number of products and/or services detailed above. The AM is responsible for monitoring all DG's (and mirrors) for damage, data integrity, usage, scheduling regular backups and also initiates emergency backups as needed. The AM also is responsible for data backups to hard, secure off-site locations, as well as any needed restorations.

Figure 3:
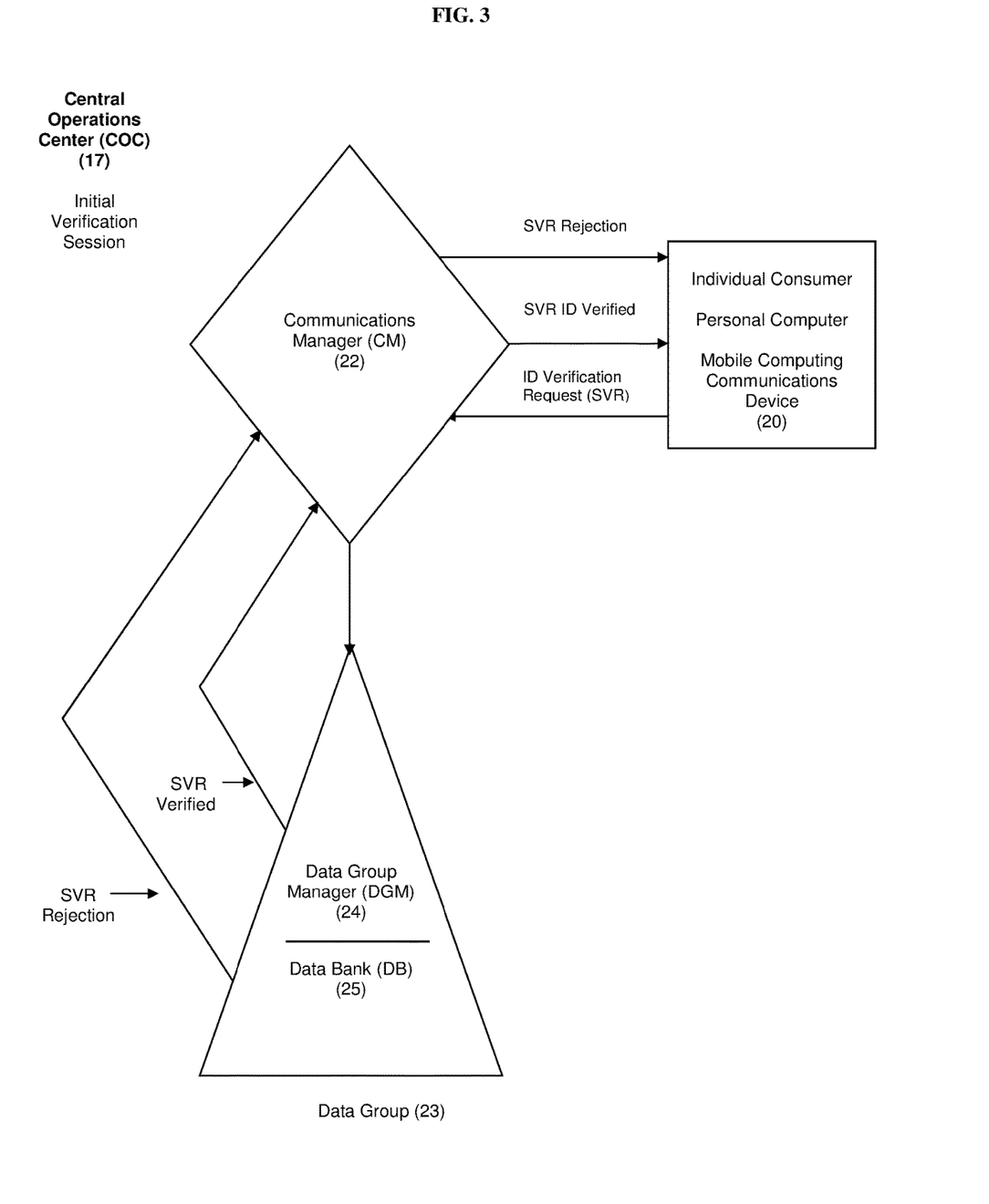
FIG. 3 is a simplified block diagram of the present biometric verification and personal data management system for the initial verification of a session, illustrating the functional steps of a method of verifying biometric markers correlated with individual consumer data of a specific consumer.

FIG. 3 illustrates the initial steps of verifying biometric markers correlated with individual consumer data of a specific consumer. Phase one comprises the steps for the initial session verification of a registered individual consumer. The step begins with the individual consumer's computer or a mobile computing communicating device 20 transmitting a session verification request (SVR) which includes biometric markers of the individual consumer, pertinent personal information, time, geo-location coordinates and the network/IP data of the individual consumer's computer or mobile computing communicating device 20.

Upon receipt of the transmitted session verification request (SVR) and individual consumer's data, the Communications Manager (CM) 22 within the Central Operations Center (COC) 17, will determine in which Data Group (DG) 23 the individual consumers information is stored; and re-directs the session verification request (SVR) to the relevant Data Group (DG) 23. Upon receipt of the session verification request (SVR) and the accompanying individual consumer data, the Data Group Manager (DGM) 24 compares the transmitted biometric markers, pertinent personal information and geo-location coordinates with verified biometric markers, pertinent personal information and geo-location coordinates on file at the Data Bank (DB) 25. In addition the Data Group Manager (DGM) 24 compares the geo-location coordinates and time with the last session to determine whether the individual consumer could reasonably travel from the geo-location coordinates of the last session to the geo-location coordinates of the present session.

Upon the individual consumer's successful log in for session use, the consumer's biometric markers correlated with unique pertinent personal information and geo-location coordinates are directed toward the Communications Manager (CM) 22 within the Central Operations Center (COC) 17. The Communications Manager (CM) 22 is responsible for receiving all Verification Requests (VR's) at consumer log in and directing them to the Data Group (DG) 23 where the individual consumer's data is stored. Once the Verification Request (VR) has been processed and is either verified or rejected by the Data Group Manager (DGM) 24, the Communications Manager (CM) 22 automatically returns the response to the individual consumer 20 waiting for verification. Upon rejection, the individual consumer may return to the information website 10 of the system to log in and correct the issue causing the rejection. Once corrected and upon verification of the individual consumer is received, they have full system access.

Figure 4:
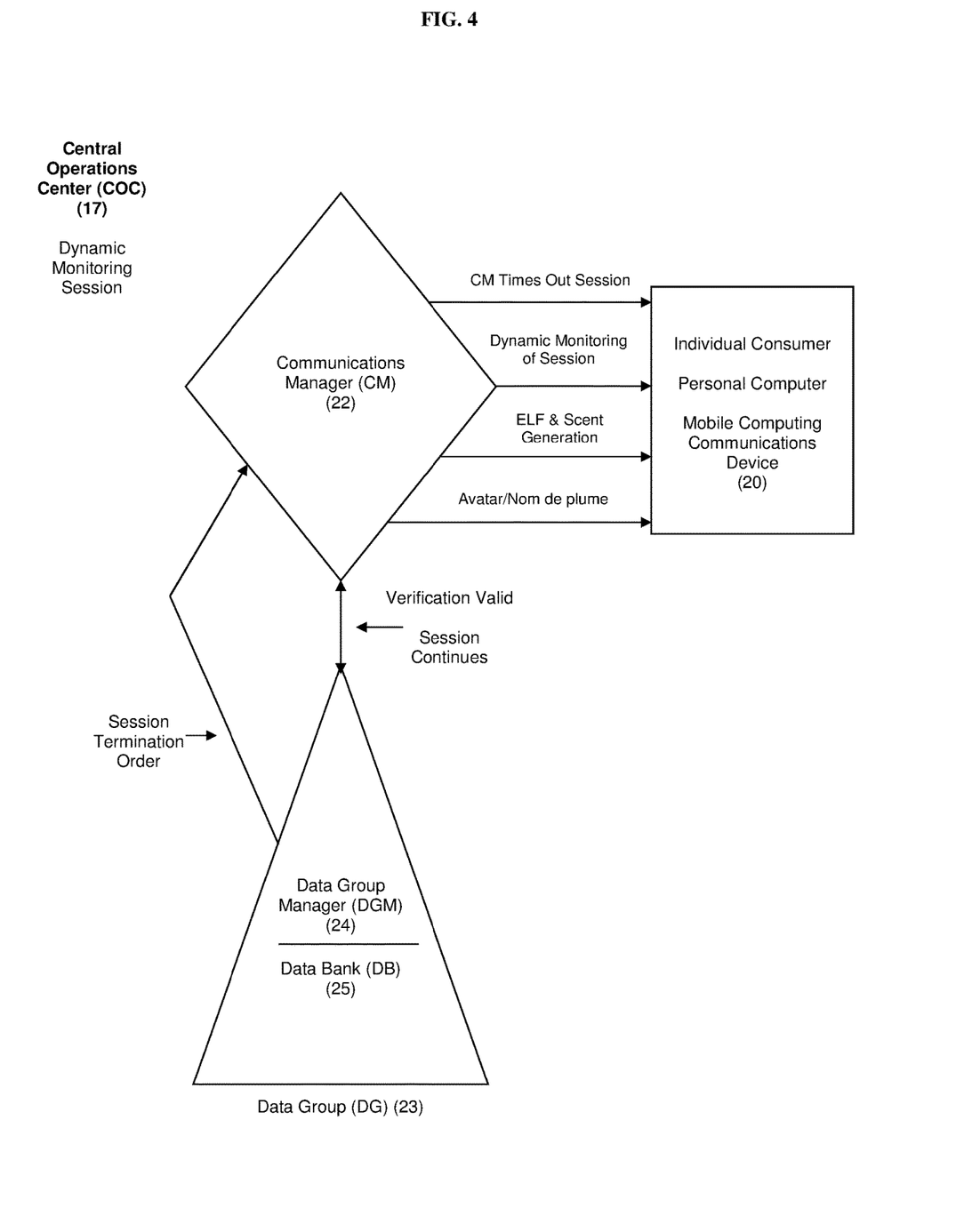
FIG. 4 is phase two of FIG. 3, a simplified block diagram of an exemplary embodiment of the present biometric verification and personal data management system for dynamically monitoring a session, illustrating the functional steps of a method of monitoring within a predetermined amount of time, tracking, analyzing, storing and distributing dynamic (live feed) biometric markers correlated with registered individual consumer data of a specific consumer.

FIG. 4 illustrates phase two of the functional steps in the present method of monitoring storing and distributing dynamic (live feed) individual consumer data of a specifically identified consumer. Phase two, comprises dynamic (live feed) monitoring of the session to ensure the verified registered individual consumer 20 is engaged in the system throughout the session. This includes monitoring dynamic biometric markers such as, but not limited to, facial or eyelid movement, pupillary or retinal dilation, breathing, heartbeat, temperature, scent, emotional, cognitive, and physical arousal, or constant finger print placement, etcetera, to maintain proof of life/identity of the registered individual consumer during session use. The Communications Manager (CM) 22 of the Central Operations Center (COC) 17 directs the monitoring stream to the relevant Data Group (DG) 25.

In addition, the Communications Manager (CM) 22 of the Central Operations Center (COC) 17, may direct the method intended to alter moods or mentally prepare, condition or stimulate human senses such as the use of an Extremely Low Frequency (ELF) pulsing field which may be projected on to individual consumers by the audio systems, or generate a scent by a device within the system which may be projected onto the individual consumer's personal computer or mobile computing communications device. The Extremely Low Frequency (ELF) pulsing field may be used for mood alterations. Frequencies within the 3.26 to 17.54 megahertz range and pulsed at 6 and 11 hertz per second are key brain wave rhythms. The predominant brain wave frequencies indicate the kind of activity taking place in the brain. There are four basic groups of brain wave frequencies, which are associated with most mental activity. The first group, beta waves (13 to 35 hertz or pulses per second), are associated with normal activity when a person's attention is directed outward, toward normal activities. The second group, alpha waves (8 to 12 hertz or pulses per second), can indicate relaxation and are ideal for learning and focused mental functioning. The third group, theta waves (4 to 7 hertz or pulses per second), indicate mental imagery allowing access to memories and internal mental focus. The fourth group, delta waves (0.5 to 3 hertz or pulses per second), are found when a person is in deep sleep. When specific frequencies are projected on to individual consumers by the audio systems of their personal computer or mobile computing communications device, the effect may be to induce a mood, which mentally prepares, conditions or stimulates the individual consumer for receiving particular promotional advertisements or promotional information in order to affect the decision to purchase a product or service or to enhance memory recall.

In addition, the Communications Manager (CM) 22 of the Central Operations Center (COC) 17, may direct the registered individual consumer's chosen identity to reflect a nom de plume and or standardized animated avatar that constantly monitors the session to be displayed on computer networks indicating the government certified identity of the registered individual consumer has been verified where a unique, encrypted identification number and identifier that can be matched only to that unique living individual human being may be embedded within the avatar.

The system functions such that individual consumers are detected within a predetermined proximity range while browsing the internet wherein the presence of individual consumers within the proximity range are detected indicating a need to display an individually unique or specific demographically appropriate promotional advertisement, for that particular demographically identified individual consumers or uniquely identified individual consumer whereby preventing automated computerized advertising fraud. Once it is sensed that viewers are no longer present within the proximity range, the idle mode is again activated for displaying the mode's associated non-advertisement information.

The collected biometric markers can then be retrieved from the system's computer server for determining what information was displayed and the duration that the promotional advertisement was in the active mode, for determining individual consumer presence, mental preparedness, mood or energy levels, identification, consumer response and what portions of the promotional advertisement may have been viewed by individual consumers. Thus, the individual consumer response and collected data provides information that indicates the individual consumer response and presence within the proximity range and viewing the computer display, along with the number of occurrences that particular promotional advertisement or segments were presented to individual consumers, since the location of each advertisement or segment of the sequence is known. Therefore, the system of the present invention provides the advertising industry a higher level of accountability than existed in the prior art.

The Data Group Manager (DGM) 24 subjects the individual consumer's 20 ongoing monitoring biometric markers to periodic comparisons during session use with the verified individual consumer's biometric markers on file. If monitored biometric markers continue to match and dynamic activity is maintained, the session proceeds uninterrupted. If the individual consumer's dynamic biometric markers are absent for a predetermined period of time or if the monitored biometric markers change from that of the registered individual consumer, a termination order is transmitted to the Central Operations Center (COC) 17. Upon receipt, from the Data Group Manager (DGM) 24 that the individual consumer's dynamic biometric markers data stream is compromised, the Central Operations Center (COC) 17 times out the session. Upon notification of a session time out, the registered individual consumer 20 may return to the information website of the system 10 to log back in.

If the individual consumer's biometric markers, pertinent personal information and geo-location coordinates match what is on file, the session verification request (SVR) is authenticated then said authentication is transmitted to the Communications Manager (CM) 22 of the Central Operations Center (COC) 17. The Communications Manager (CM) 22 directs the session verification request (SVR) authentication to the registered individual consumer 20 and or a subscriber client 26 (described below), as appropriate. Once authentication to the registered individual consumer 20 and or the subscriber client 26 is received, they have full system access.

If the individual consumer's biometric markers, pertinent personal information and geo-location coordinates do not match what is on file, which may indicate fraud, (e.g. insufficient time for registered individual consumers to travel from the geo-location coordinates of the previous session to the geo-location coordinates of the present session), the session verification request (SVR) is denied. The session verification request (SVR) denial is transmitted to the Communications Manager (CM) within the Central Operations Center (COC) 17 which then transmits the rejection to the individual consumer and or the subscriber client. The session is then terminated.

Figure 5:
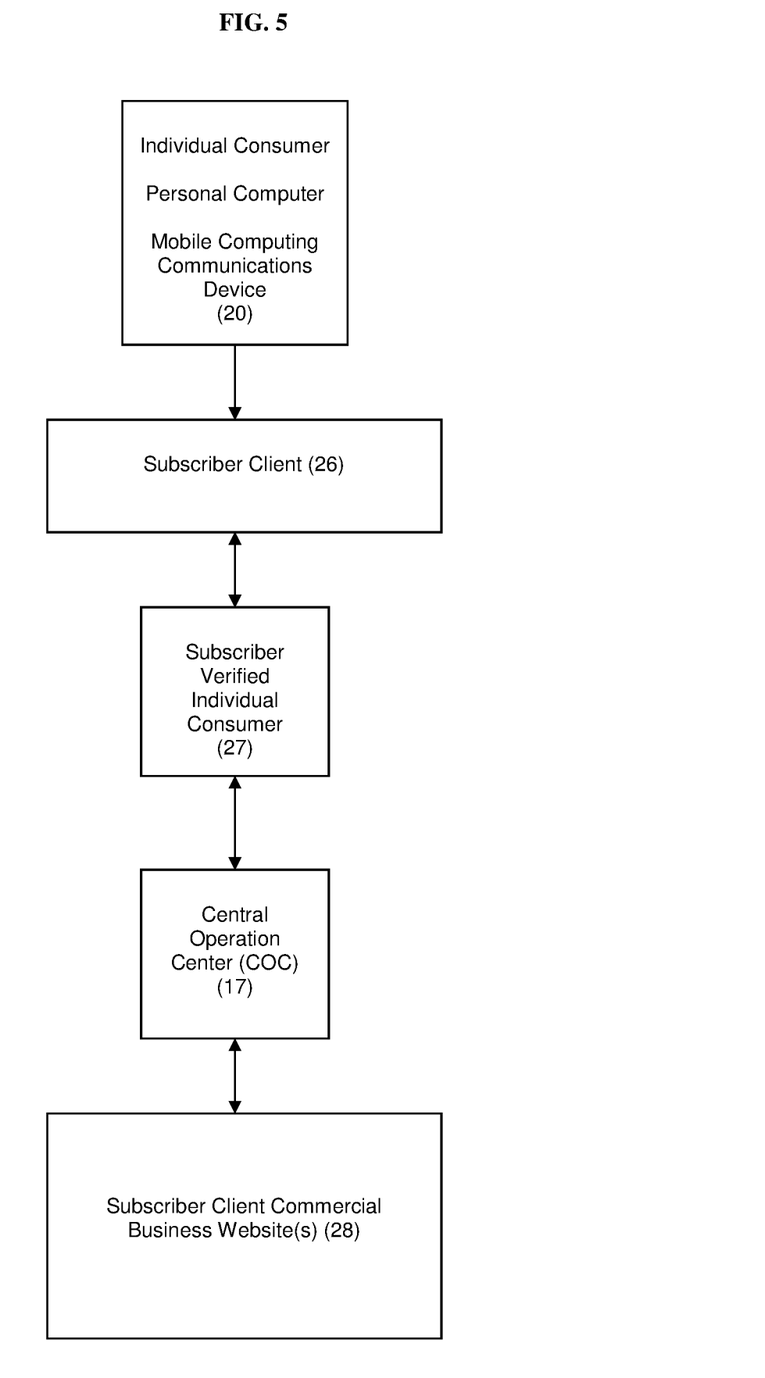
FIG. 5 is a flow chart illustrating the steps of a distribution method of the present invention when utilized for a particular subscriber client with the requirements of each subscriber client being unique and the present system configured to accommodate the differing requirements of each subscriber client's distribution channels.

FIG. 5 illustrates the steps of in the method of commercial distribution when utilized for a subscriber client. The present system and method is configured to accommodate the differing distribution channel requirements of subscriber clients. The process begins with the individual consumer 20 logging in to the subscriber client's commercial business website 26 of choice. Upon login, the selected commercial business website 26 directs the individual consumer's personal computer or mobile computing communications device 20 to upload the individual consumer's dynamic biometric markers data stream, directed toward the system's Central Operations Center (COC) 17.

Upon receipt of the individual consumer's biometric markers data stream, the Central Operations Center (COC) 17 verifies or rejects the individual consumer's identity. Upon verification, the verified individual consumer's biometric markers 27 within the Central Operations Center (COC) 17, acts as a portal to the subscriber client's commercial business website(s) 28. Throughout the system's session use, the Central Operations Center (COC) 17 monitors the individual consumer's dynamic biometric markers data stream. Should the individual consumer's biometric markers data become compromised, the Central Operations Center (COC) 17 terminates the session and informs the subscriber client of a possible security breach.

Figure 6:
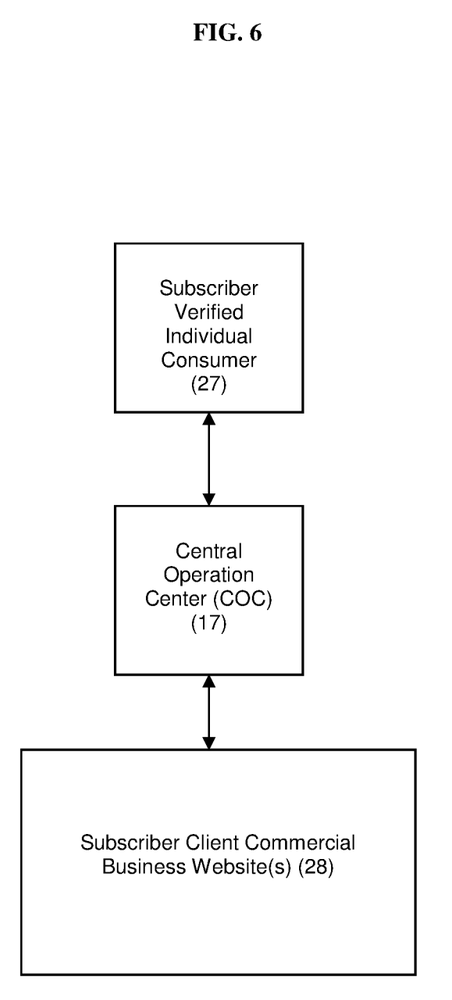
FIG. 6 is a flow chart illustrating the steps of a modification of the distribution method of the present invention when utilized for a particular subscriber client with the requirements of each subscriber client being unique and the present system and method configured to accommodate the differing requirements of a subscriber client's distribution channels.

FIG. 6 is a flow chart illustrating an alternate method of distribution when utilized for a particular subscriber client with the requirements of each subscriber client being unique. This method is designed to accommodate the differing requirements of a subscriber client's distribution channels. The registered individual consumer logs into the system's Central Operations Center (COC) 17 whereupon the biometric markers of the individual consumer is either verified or rejected. Upon rejection, the registered individual consumer may correct the issue causing the rejection and return to the information website 10 of the system to log back in. Upon the individual consumer's biometric markers verification 27, the Central Operations Center (COC) 17 acts as a portal to the verified individual consumers commercial business website(s) 28 of choice. Throughout the session use, the system Central Operations Center (COC) 17 periodically monitors the registered individual consumer's biometric markers data stream. If no discrepancies arise, the session continues unabated. Should the individual consumer's biometric markers data stream become compromised, the session is terminated and the individual consumer is notified of the possible security breach.

It should be understood from the foregoing that the present system may be implemented as a commercial identification system suitable for billions of individual consumers where each individual consumer is provided with a Unique Identification Number (UIN) in order to improve the provisioning of commercial services by enhancing administrative performance.

It should also be understood that the present may be configured and implemented with various selected biometric markers for carrying out operations related to a specific registered consumer for commercial endeavors and for various markets and commercial entities. The following are several non-limiting examples.

Example 1

The present system implemented with a computer ready camera and computer ready mouse may be utilized for determining whether a registered individual consumer meets the age requirement for an appropriate age for accessing adult content on the Internet such as pornography or gambling, accessing adult content on the Internet such as social networks to aid in child predation prevention, authenticating dynamic registered consumer identification to aid commercial websites and banking institutions in credit card theft prevention endeavors, authenticating dynamic registered consumer identification to aid consumer credit bureaus and security-background check companies in anti-identity theft endeavors, to aid registered consumer identification in accessing automobiles, to aid in accessing building structures, to aid in accessing air transportation, to aid in accessing cruise ships, or to aid the ride sharing industry in conducting driver and rider identity verification.

Example 2

The present system implemented with a computer ready camera, a computer ready mouse, and an electronic signature pad may be used for authenticating dynamic registered consumer identification to aid notary publics in authenticating the execution of documents.

Example 3

The present system implemented with a computer ready camera, a computer ready mouse, and an infrared scanner may be used for authenticating dynamic registered consumer identification and the determination of alcohol consumption to aid employers in workplace enforcement for employees on-site, traveling or telecommuting, and authenticating dynamic registered consumer identification to aid academic institutions in conducting roll-call or proctoring online testing.

Example 4

The present system implemented with a computer ready camera, computer ready mouse, and a skin conductance biosensor, may be utilized for authenticating dynamic registered consumer identification to aid rating and polling services, and to aid in military use, regulatory/law enforcement, government intelligence communities, government electoral voting methods and disbursement of government entitlement programs, and fraud detection Example 5

The present system implemented with a computer ready camera, a microphone, a bio-metric mouse, a BP cuff, a thermometer, a pulse and respiration detector, a skin conductance biosensor, a urine analyzer, a fecal analyzer, a blood and blood sugar analyzer, a scent receiver, an electrocardiogram, a smart contact lens, or embed sensors, may be utilized for authenticating dynamic registered consumer identification to aid healthcare providers in examining, diagnosing and providing a prognosis and prescribing treatment while maintaining advanced security for medical records.

Example 6

The present system implemented with a computer ready camera, a thermometer, a pulse and respiration detector, a skin conductance biosensor, or embed sensors may be utilized for authenticating dynamic registered consumer identification to aid in the carbon dioxide (CO2) trading markets, to broker the sale of carbon credits based on the reduced excretion of CO2 measured from registered consumers participating in CO2 monitoring programs, where healthy adults measure between 12-20 breathes per minute. Compensation to the participating registered consumer may be one or more of the following but not limited to, an award in the form of a monetary credit or incentive to an online banking repository or commercial institution, a donation credit or incentive to a non-profit organization, or a predetermined amount or value incentive of a frequent user award program for the individual consumer to redeem within the system.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

What is claimed is:

1. A computer implemented system for digitally authenticating, registering, and enrolling a consumer in a secure online identity verification system that prevents identity fraud and provides public anonymity to the consumer based on the consumer's live feed dynamic biometric information gathered via the Internet, the system comprising:
   a server coupled with a computer processor having memory storage and computer executable software programs stored therein;
   a biometric detection and collection device connected in communication with said computer processor and operative upon instructions from said computer program instructions to gather biometric information from the individual consumer;

a registered biometric detection and collection device interfaced in communication with a registered personal computer or mobile computing communication device and interfaced in communication with a government agency;

upon execution of software program instructions by said computer processor, said biometric detection and collection device and said registered personal computer or mobile computing communication device are caused to gather biometric markers and uniquely personal information directly from an individual consumer to authenticate the identity and proof of life of the individual consumer, and the geo-location to identify the latitude and longitude to specifically locate the individual consumer;

biometric markers and uniquely personal information encrypted and embedded within at least one or more of a nom de plume, icon, and avatar;

the biometric detection and collection device interfaced with a registered personal computer or mobile computing communication device that transmits the gathered biometric markers, uniquely pertinent personal information and geo-location coordinates over a wired or wireless connection to a central repository for verification of identification;

said central repository for identification verification including a communication manager processor and an archive manager processor within a central operations center;

said communication manager processor configured to receive at log in, a verification request of the gathered biometric markers, uniquely pertinent personal information, and geo-location coordinates to direct the biometric markers, uniquely pertinent personal information and location coordinates to a selected data group where the individual consumer data is stored to be processed and either verified or rejected by the data group manager which automatically returns the response to the individual consumer waiting for verification; and a database on a computer server that stores the individual consumer's biometric data and evaluates the verification request to determine if the individual consumer matches the individual consumer.

2. The system according to claim 1, wherein said biometric detection and collection device is configured to gather through said interfacing registered personal computer or mobile computing communication device, biometric markers, uniquely personal information, geolocation coordinates, and unique identifiers directly from an individual consumer, selected from group consisting of the individual consumer's name, alias, birth date, city, state and/or country of birth, parents married and maiden name(s), current address, current and past employer(s), preferred password, social security number, physical description characteristics, categorical selection of interests and related information.

3. The system according to claim 1, wherein said biometric detection and collection device is configured to gather biometric information from the individual consumer through said interfaced registered personal computer or mobile computing communication device and is electronically interfaced in communication with a government agency to transmit encrypted biometric markers and encrypted uniquely pertinent personal information of said individual consumer through said system server.

4. The system according to claim 1, wherein said central operations center includes a communication manager processor configured to analyze the encrypted biometric markers, encrypted uniquely pertinent personal information, and geo-location coordinates to identify patterns for developing a unique profile; and a data group processor interfaced with said communication manager processor configured to select a database corresponding to said identified patterns.

5. The system according to claim 4, wherein said communication manager processor is further configured to analyze the encrypted biometric markers, encrypted uniquely pertinent personal information, and geo-location coordinates to authenticate the individual consumer's proof of life with a government agency, and to select a database based on the identified patterns of biometric markers correlated with uniquely pertinent personal information and geo-location coordinates.

6. The system according to claim 4, wherein said communication manager processor is further configured to select a local database at a local level of the database when the biometric markers, uniquely pertinent personal information, and geo-location coordinates gathered from the individual consumer indicates that the individual consumer may be located in an associated local area for more than a threshold period of time.

7. The system according to claim 4, wherein said communication manager processor is configured to select a regional database associated with a plurality of locations when the biometric markers, uniquely pertinent personal information, and geo-location coordinates gathered from the individual consumer indicates that the individual consumer may be located in an associated local area for less than the threshold period of time.

8. The system according to claim 1, wherein said biometric detection and collection device includes a camera, including those used in Kirlian photography, for obtaining a photographic image of the individual consumer.

9. The system according to claim 1, wherein said biometric detection and collection device includes at least one of: a microphone, a biometric computer mouse, a sphygmomanometer cuff, a thermometer, a pulse detector, a respiration detector, a microwave plethysmograph, a skin conductance biosensor, a urine analyzer, a fecal analyzer, a blood analyzer, a blood sugar analyzer, a scent receiver, a scent generator, an electrocardiogram, a smart contact lens, an embed sensor, a sub-dermal implant, a universal product code (UPC) scanner, an infrared scanner, a radio-frequency identification (RFID) scanner, a pulse oximetry, a magnetic stripe reader, a 3-D dental scanning device, and an electronic signature pad.

10. The system according to claim 1, wherein said archive manager processor monitors all the data group data for damage, data integrity, usage, scheduling of regular backups, initiates emergency backups as needed and is responsible for data backups to hard, secure off-site locations, as well as any needed restorations;

said communication manager processor is configured to randomly store the gathered encrypted biometric markers, encrypted uniquely pertinent personal information and geo-location coordinates separately to the selected data group manager processor then randomly send a separate copy of the biometric markers, uniquely pertinent personal information and geo-location coordinates to the selected database which are location independent when all system components are networked using an ultrahigh-speed network;

said data group manager serving as the database controller and processing center that receives a verification request from the communication manager processor, then accesses the database where the individual consumer's biometric data is stored and evaluates the verification request to determine if the individual consumer matches the gathered biometric data, the group manager monitors the time used for each individual consumer verification request and if, due to traffic density, this response time exceeds a maximum response time threshold, will automatically route verification requests to as many mirror sites as necessary to remain within the required response time;

the biometric data belonging to where a verification request is received from the communication manager, the data group manager will access the database;

data group mirror sites used to maintain processing speed and response time during periods of high demand; and, a central operations center configured to receive verification requests of the gathered biometric markers, uniquely personal information, and geo-location coordinates and direct them to a selected data group in a biometric verification and data management system having a plurality of data banks at multiple levels of a database, and having a data group manager program configured to select the database based on the uniquely personal information and geo-location coordinates gathered from the individual consumer.

11. The system according to claim 1, further comprising; a registered personal computer or mobile computing communication device configured to receive through an input mechanism, the unique identification number of an unverified individual consumer; gather through a biometric detection and collection device, new biometric markers, uniquely pertinent personal information and geo-location coordinates from the unverified individual consumer; and transmit the unique identification number and new biometric markers, uniquely pertinent personal information and geo-location coordinates, interfacing with a registered personal computer or mobile computing communication device over a wired or wireless connection to a communication manager processor with a verification request to authenticate the identity of the unverified individual consumer with a government agency; and to receive a positive or negative verification report from the government agency to authenticate proof of life or deny authenticity of the proof of life.

12. The system according to claim 1, wherein said central operations center is interfaced in communication with an electronic media device selected from the group consisting of e-billboards, set top boxes, casino slot machines, smart eyewear, movie theatres, mobile computing communication devices, and point of sale (POS) devices.

13. The system according to claim 1, wherein said central operations center is interfaced in communication with an electronic communication device selected from the group consisting of electronic mail, text messaging programs, and secure peer-to-peer communication video call service systems, and communication can only be received by the identified and registered consumer associated with the corresponding address or phone number for the electronic mail, text messaging or secure peer-to-peer communication video call service system.

* * * * *